United States Patent [19]
Andersson et al.

[11] Patent Number: 5,654,051
[45] Date of Patent: Aug. 5, 1997

[54] PACKAGING MATERIAL AND PACKAGING CONTAINERS PRODUCED THEREFROM

[75] Inventors: Kurt Andersson, Helsingborg; Per Lindberg, Påarp, both of Sweden

[73] Assignee: Tetra Laval Holdings & Finance S.A., Pully, Switzerland

[21] Appl. No.: 500,112

[22] Filed: Jul. 10, 1995

Related U.S. Application Data

[63] Continuation of Ser. No. 229,344, Apr. 18, 1994, abandoned.

[30] Foreign Application Priority Data

Apr. 29, 1993 [SE] Sweden ................... 9301469

[51] Int. Cl.⁶ .................. B65D 65/40; B32B 27/08
[52] U.S. Cl. .................. 428/35.7; 428/516; 428/500; 525/240
[58] Field of Search .................. 428/35.7, 411.1, 428/516, 500, 511; 525/240

[56] References Cited

FOREIGN PATENT DOCUMENTS

| 0353496 | 2/1990 | European Pat. Off. . |
| 0494595 | 7/1992 | European Pat. Off. . |
| 3297642 | 12/1991 | Japan . |

*Primary Examiner*—Charles Nold
*Attorney, Agent, or Firm*—Burns, Doane, Swecker & Mathis, L.L.P.

[57] ABSTRACT

A packaging material is disclosed for producing dimensionally stable, liquid-tight packaging containers for liquid foods.

The packaging material (10) has a core layer (11) of thermoplastic and filler admixed into the thermoplastic in a quantity of between 30 and 70% of the total weight of the packaging material.

The thermoplastic in the core layer (11) consists of a mixture of a first thermoplastic which may be a propylene homopolymer or an ethylene/propylene copolymer, and a second thermoplastic which is a polyethylene. The quantity of said polyethylene is between 5 and 50% of the total thermoplastic quantity of the core layer.

From a web or a sheet of the packaging material, dimensionally stable, liquid-filled packaging containers can be produced by fold forming and heat sealing in a conventional manner. Such packaging containers can also be produced using other conventional techniques such as blow moulding and thermoforming.

18 Claims, 1 Drawing Sheet

PACKAGING MATERIAL AND PACKAGING CONTAINERS PRODUCED THEREFROM

This application is a continuation of application Ser. No. 08/229,344, filed Apr. 18, 1994 now abandoned.

TECHNICAL FIELD

The present invention relates to a packaging material including a core layer of thermoplastic and filler admixed into the thermoplastic, and to packaging containers produced from the packaging material. Such packaging material and packaging containers, respectively, are known from, for example, EP-A-O 353 991, EP-A-O 353 496, EP-A-O 494 594, EP-A-O 494 595, EP-A-O 499 086, EP-A-O 503 314, and EP-A-O 512 364.

BACKGROUND ART

The packaging materials described in the above European Patent Publications include a core layer of polypropylene containing filler distributed in the polypropylene in order to give the packaging material increased rigidity. In such instances, the polypropylene consists of a propylene homopolymer with a melt index of less than 1 according to ASTM (2,16 kg; 230° C.), or an ethylene/propylene copolymer with a melt index of between 0,5 and 5 according to ASTM (2,16 kg; 230° C.). The quantity of filler is between 50 and 80% of the total weight of the core layer.

From a web or from a prefabricated blank of the packaging material, configurationally stable, liquid-tight packaging containers are produced employing modern, rational packaging machines of the type which forms, fills and seals the packages.

From, for example a web, such a configurationally stable, liquid-tight packaging container is produced in that the web is reformed into a tube, by both longitudinal edges of the web being permanently united to one another by so-called heat sealing in a mechanically strong, liquid-tight lap joint or seam. The tube is filled with the desired contents and divided into closed packages by repeated heat sealings of the tube, transversely of the longitudinal axis of the tube and beneath the level of the contents in the tube. The packages are separated from one another by incisions in the transverse sealings and are given the desired geometric, normally parallelepipedic, final configuration by a further forming and heat sealing operation, for the creation of the finished packaging containers.

From the packaging material, configurationally stable, liquid-tight packaging containers can also be produced by so-called thermoforming which takes as it point of departure the fact that the packaging material is, by heat and pressure (or heat and vacuum), formed into bowl or cup-shaped containers which are filled with the desired contents and thereafter sealed with the aid of a thermoplastic foil which is applied over the openings of the containers and is welded in place by heat sealing around the entire circumferential contour of the opening of the container.

It is also possible to produce such packaging containers in the form of, for instance, bottles by a blow molding technique in a per se known manner.

Packaging containers of the type described above are often employed for packing and transporting liquid or solid foods such as milk, juice, and margarine, and the demand placed on such packaging containers is that they must be configurationally stable and mechanically strong in order to be able to be handled conveniently during transport and use. This means that the packaging containers must withstand impacts, jolts and other external mechanical action to which the packaging containers are subjected under normal handling conditions during transport.

A liquid-filled, closed packaging container of a packaging material known in the art consisting of a propylene homopolymer of a melt index of less than 1 according to ASTM (2,16 kg; 230° C.) and filler admixed into the propylene homopolymer in the above-disclosed quantity possesses good mechanical strength both as regards configurational stability and sealing strength when being handled at room temperature, but functions less satisfactorily at temperatures below 10° C., which often prevail on the distribution of milk. At these lower temperatures, the packaging material becomes brittle and ruptures or cracks easily in the sealing joints or seams when they are subjected to impact and jolts. A certain improvement is, however, achieved by a packaging material consisting of an ethylene/propylene copolymer of a melt index of between 0,5 and 5 according to ASTM (2,16 kg; 230° C.) and a filler admixed into the ethylene/propylene copolymer in the disclosed quantity.

According to the present invention, it has proved that a liquid-tight packaging container of the above-described type can be produced, with even further improved configurational stability and mechanical strength, by a simple modification of the known packaging material.

SUMMARY OF THE INVENTION

One object of the present invention is, therefore, to realize such a modified packaging material and a packaging container produced therefrom with improved mechanical strength and configurational stability.

This object is attained according to the present invention in that a packaging material of the type described by way of introduction has been given the characterizing feature that the thermoplastic consists of a physical mixture of polypropylene and polyethylene.

By mixing polyethylene into the polypropylene, it has surprisingly proved that the packaging material according to the present invention has a considerably higher impact toughness at lower temperatures (<10° C.) than a corresponding packaging material without polyethylene. Moreover, the packaging material will obtain an improved thermoforming capability which makes the material particularly suitable for producing packaging containers by thermoforming.

Further advantageous and expedient embodiments of the packaging material according to the present invention have moreover been given the characterizing features as set forth in the appended subclaims.

BRIEF DESCRIPTION OF THE ACCOMPANYING DRAWINGS

The present invention will now be described in greater detail hereinbelow, with particular reference to the accompanying Drawings. In the accompanying Drawings:

FIG. 1 schematically illustrates a cross section of a packaging material according to the present invention; and FIGS. 2–4 schematically illustrate different types of packaging containers produced from the packaging material.

DETAILED DESCRIPTION OF THE INVENTION

Figure 1:
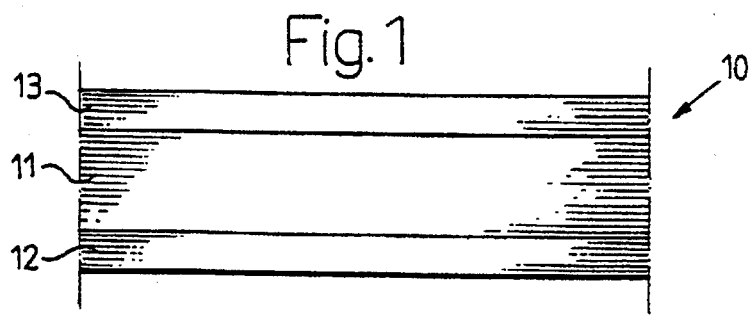

The packaging material according to the present invention has been given the generic reference numeral 10 in FIG. 1. The packaging material 10 has a core layer 11 of thermoplastic and filler admixed into the thermoplastic in a quantity of between 30 and 70%, calculated on the total weight. The thermoplastic in the core layer 11 consists of a physical mixture of a first thermoplastic which is either a propylene homopolymer of a melt index of between 0,5 and 5 according to ASTM (2,16 kg; 230° C.), or an ethylene/propylene copolymer of a melt index of between 0,5 and 5 according to ASTM (2,16 kg; 230° C.), and a second thermoplastic which is a polyethylene. Said polyethylene may be a low density polyethylene (LDPE) or a high density polyethylene (HDPE). ASTM (2,16 kg; 190° C.) 0.1–4.

The quantity of the second thermoplastic or the polyethylene in the physical mixture of the two thermoplastics in the core layer 11 may vary, but is in practice between 5 and 50% of the total thermoplastic weight of the core layer 11.

The filler which is employed in the core layer 11 may be any optional conventional filler such chalk, talcum, mica, dolomite etc., separately or in optional mutual combinations with one another.

As shown in FIG. 1, the packaging material 10 may also include an outer sealing layer 12 and 13 disposed on one or both sides of the core layer 11 and consisting of a thermoplastic of the same type as that employed in the core layer 11, eg. polyethylene and/or polypropylene. The purpose of said sealing layer, which need not necessarily be employed in the packaging material 10 according to the present invention, is to improve the heat-sealing properties of the packaging material and/or to protect the filler in the core layer 11 against chemical attack from, for example, the contents in a packaging container produced from the packaging material. Such a sealing layer is particularly advantageous when the filler is hygroscopic.

As has been mentioned previously, configurationally stable, liquid-filled packaging containers can be produced either by fold forming and heat sealing, by thermoforming or by blow molding of the packaging material according to the invention.

Figure 2:
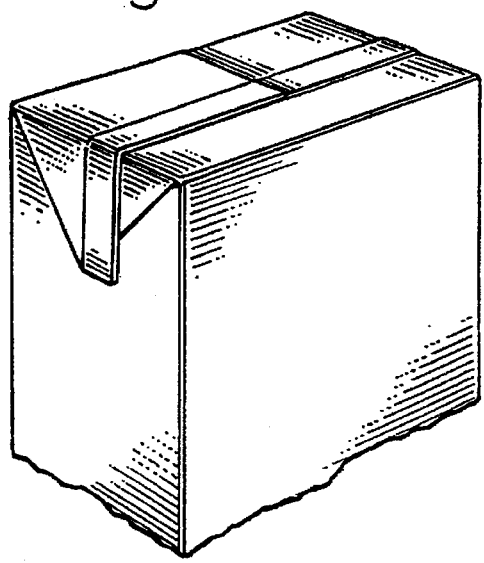

FIG. 2 schematically illustrates the upper part of a conventional packaging container of the Tetra Brik® type which is produced by fold forming and sealing of a web of the packaging material in the manner described previously.

Figure 3:
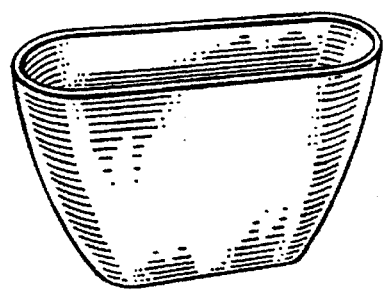
Figure 4:
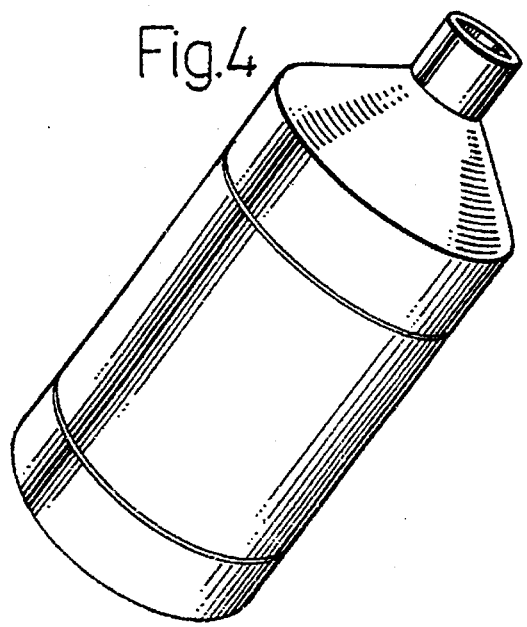

FIG. 3 schematically illustrates one example of a packaging container produced by thermoforming, and, finally FIG. 4 shows one example of a packaging container produced by blow molding of the packaging material according to the invention.

In a practical experiment which has been carried out in accordance with the present invention, a 1 liter packaging container was produced of the type shown in FIG. 2 by fold forming and heat sealing of a web of a packaging material consisting of 10% HDPE, 25% polypropylene and 65% dolomite. The thus produced packaging container was tested at +4° C. in respect of its drop toughness, i.e. the drop height the liquid-filled packaging container withstood without cracking or rupturing after a free fall onto a substrate. The result of this test was 120–160 cm. A corresponding test was carried out using a similar packaging container of a known packaging material. The result of this test was that the drop toughness of the packaging container was limited to a drop height of only 40–70 cm.

It will be apparent from the foregoing that the present invention realizes, by simple means and in a simple manner, a packaging material which makes possible production of a packaging container with considerably improved mechanical strength properties as compared with a packaging container which is produced from a corresponding known packaging material. Even though the present invention has been described above with reference to a specific example of a packaging container, it is of course not limited exclusively to that example. Other conventional packaging container types are also applicable within the spirit and scope of the general inventive concept as this is defined by the appended Claims.

What is claimed is:

1. A packaging sheet comprising a core layer of thermoplastic and filler admixed into the thermoplastic, wherein the thermoplastic comprises a physical mixture of polypropylene and polyethylene, the polyethylene being provided in an amount which increases impact toughness at temperatures less than 10° C. and constituting between about 28% and 50% by weight of the thermoplastic physical mixture.

2. The packaging sheet as claimed in claim 1, wherein said polypropylene is either a propylene homopolymer of a melt index of between 0.5 and 5 according to ASTM procedure D 1238 (2.16 kg; 230° C.), or an ethylene/propylene copolymer of a melt index of between 0.5 and 5 according to ASTM procedure D 1238 (2.16 kg; 230° C.).

3. The packaging sheet as claimed in claim 1, wherein said polyethylene is a low density polyethylene (LDPE), or a high density polyethylene (HDPE).

4. The packaging sheet as claimed in claim 1, wherein said filler constitutes between 30% and 70% of the total weight of the packaging sheet.

5. The packaging sheet as claimed in claim 1, wherein said sheet has an outer coating of polypropylene or polyethylene affixed to one side of said core layer.

6. A packaging container produced by fold forming and heat sealing of a packaging sheet as claimed in claim 1.

7. A packaging container produced by thermoforming of a packaging sheet as claimed in claim 1.

8. A packaging container produced by blow moulding of a packaging sheet as claimed in claim 1.

9. A packaging sheet comprising a core layer of thermoplastic and filler admixed into the thermoplastic, wherein the thermoplastic consists of a physical mixture of polypropylene and polyethylene, the polyethylene being provided in an mount which increases impact toughness at temperatures less than 10° C. and constituting between 28% and 50% by weight of the thermoplastic physical mixture.

10. The packaging sheet as claimed in claim 1, wherein said polyethylene constitutes about 28% of the thermoplastic physical mixture.

11. A packaging sheet comprising a core layer of thermoplastic and filler admixed into the thermoplastic, wherein the core layer comprises about 10% by weight polyethylene, about 25% by weight polypropylene and about 65% by weight filler.

12. The packaging sheet as claimed in claim 11, wherein said polypropylene is either a propylene homopolymer of a melt index of between 0.5 and 5 according to ASTM procedure D 1238 (2.16 kg; 230° C.), or an ethylene/propylene copolymer of a melt index of between 0.5 and 5 according to ASTM procedure D 1238 (2.16 kg; 230° C.).

13. The packaging sheet as claimed in claim 11, wherein said polyethylene is a low density polyethylene (LDPE), or a high density polyethylene (HDPE).

14. The packaging sheet as claimed in claim 11, wherein said filler is dolomite.

15. The packaging sheet as claimed in claim 11, wherein said sheet has an outer coating of polypropylene or polyethylene affixed to one side of said core layer.

16. A packaging container produced by fold forming and heat sealing of a packaging sheet as claimed in claim 11.

17. A packaging container produced by thermoforming of a packaging sheet as claimed in claim 11.

18. A packaging container produced by blow molding of a packaging sheet as claimed in claim 11.

* * * * *